June 20, 1933.                K. IMHOFF ET AL                    1,914,829
                              HOUSEHOLD FILTER
                            Filed Sept. 6, 1930
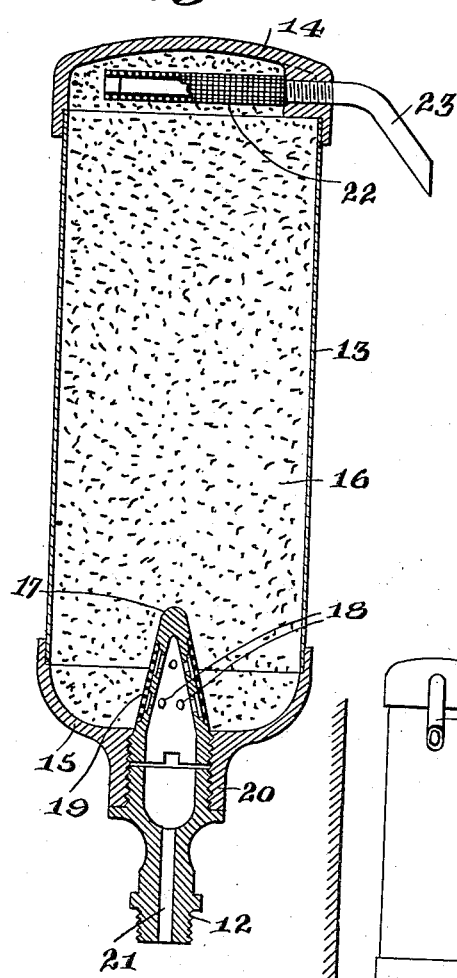
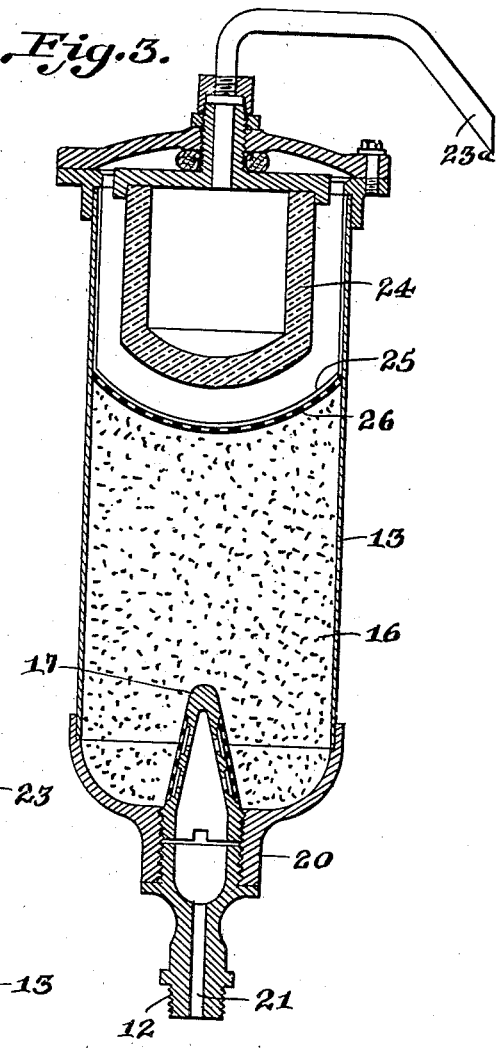
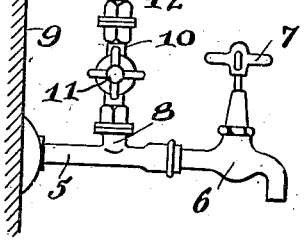
Inventors
Karl Imhoff
Friederich Sierp
AND Paul Brinkhaus
By C. P. Goepel,
Attorney Patented June 20, 1933

1,914,829

UNITED STATES PATENT OFFICE

KARL IMHOFF, FRIEDERICH SIERP, AND PAUL BRINKHAUS, OF ESSEN, GERMANY

HOUSEHOLD FILTER

Application filed September 6, 1930, Serial No. 480,214, and in Germany August 17, 1929.

The present invention relates to improvements in household filters, and has for an object to provide an improved filter particularly useful in connection with the filtration of drinking water and acting to remove objectionable odors and bad taste from the drinking water, converting such drinking water into a sweet odorless water.

Another object of the invention is to provide an improved filter construction so associated and related to a faucet or spigot that the service water in its unfiltered condition may be had from the spigot when desired; and the filter may be cut in when the filtered water for drinking purposes is wished.

A further object of the invention is to provide an improved form of filter, in which by a compact and relatively small filter construction, the water may be divested of its impurities and odor and delivered in a sweet and wholesome condition for drinking purposes.

With the foregoing and other objects in view, the invention will be more fully described hereinafter, and will be more particularly pointed out in the claims appended hereto.

In the drawing, wherein like symbols refer to like or corresponding parts throughout the several views, Figure 1 shows a side view of a service spigot with the improved filter and filter connection attached.

Figure 2 is a longitudinal section taken on an enlarged scale through one form of the improved filter, and Figure 3 is a similar view showing a modification.

Referring more particularly to the drawing, 5 designates a water service pipe and merging from the wall of a building and connecting with a faucet or spigot 6 having the usual valve 7 for turning on and off the water.

The service pipe 5 is provided with a union or connection 8 extending upwardly therefrom in proximity to the wall 9 for connection to a riser pipe 10 having therein a valve 11. This riser pipe connects with a fitting 12 at the lower end of the filtering device.

As shown in Figure 2 the filtering device includes a container body 13 closed at its upper end by an appropriate cover 14 and at its lower end by a cover or bottom 15. Within the container is a filter bed or mass 16, preferably activated carbon, and into the lower portion of this mass projects a cone 17 having perforations 18 therein in suitable number; the perforated side wall of the cone being covered with wire mesh or other appropriate material 19. The base of the cone is threaded or otherwise removably secured to the bottom cover 15 and the fitting 12 is also secured or otherwise removably secured into this bottom cover 15; the bottom cover being preferably provided with a tubular internally threaded extension 20 for this purpose.

The bore 21 of the fitting 12 is preferably of small diameter in order to restrict the flow of water through the filter. In the upper portion of the filter a perforated and mesh covered tube 22 extends for a great distance into the filter mass. This tube 22 connects with a spout 23 by which the purified drinking water is delivered.

In the use of the invention, the valve 11 will ordinarily be kept closed. The valve 7 may be opened from time to time as water is desired to flow through the spigot 6 as for instance in the washing of dishes and the like. However, when drinking water is desired the spigot 7 is closed, and the valve 11 opened whereby the service water will flow upwardly through the connection 12 and through the cone 17, being dispersed thereby in minute streams laterally and upwardly or into substantially diagonal direction through the base of the filter mass, up through which it will pass to the tube 22 and out through the spout 23. The direction of flow of the water from the lower portion to the upper portion of the filter has the advantage that the filter must be filled with water before any water can be discharged at the spout 23, thereby insuring that all parts of the filter are equally saturated with the water, resulting in the use and activity of the entire filter body 16.

It is found that such filter is superior in result to a filter of equal size, where the water enters at the top and is drawn off at the bottom. The restricted bore 21 will only permit the water to enter the filter in such volume as to correspond with the allowable maximum velocity prescribed for the filter mass 16.

In accordance with the illustration of Figure 3, the invention is applicable to a Berkefeld filter candle type of filter for filtering bacteria. Similar parts are similarly numbered. The variation consists in leaving the upper portion of the container 13 free of the filter bed and inserting in place thereof a filter candle 24 of the type referred to, the interior of which connects with the spout 23ª. This filter candle 24 is contained in and spaced from a perforated sheet metal or other cylinder 25 covered with wire web 26 or other desired material.

The operation of this form of filter is the same as previously described, the water passing first through the activated carbon 16 and thence through the filter candle 24 before it is discharged through the pipe 23ª.

It is obvious that various changes and modifications may be made in the details of construction and design of the above specifically described embodiment of this invention without departing from the spirit thereof, such changes and modifications being restricted only by the scope of the following claims.

What is claimed is:—

1. A filter for household use having a tubular body container with a removable top and bottom cover therefor and activated carbon throughout the interior of the container, an outlet means at the top portion of the container for drawing off fluid passing upwardly through the container, a removable tubular body projecting axially from the bottom cover and having a conical shaped portion with openings on the sides thereof embedded in and surrounded by the mass of carbon in the container, and a nipple portion in the bottom cover in alignment with the tubular body having a restricted bore in communication with a source of fluid supply, said conical portion and part of the nipple portion having an expanded chamber in communication with the restricted bore, whereby water forced through the bore under pressure is gradually forced outwardly and upwardly from the conical portion evenly through the carbon mass whereby to avoid channelling and caking of said mass.

2. In a household filter for liquids having a shell for a filtering medium, an inlet at the lower portion of the container and a tubular body above the bed from which the fluid passes outwardly of the container, a removable conical shaped body projecting upwardly of and in alignment with the inlet and having perforations on the sides thereof embedded in and surrounded by said filtering medium, a nipple in communication with said source of liquid supply and connected with the conical portion thereof, perforated means opposite the conical portion and above the filtering medium for retaining the same in compact position for preventing channelling of the bed when the liquid passes diagonally upward from the conical portion thereof, and a cylindrical bacteria filtering member in communication with the tubular body above the bed for permitting clear effluent from the filtering medium to be freed of any bacteria.

In testimony that we claim the foregoing as our invention, we have signed our names hereto.

KARL IMHOFF.
FRIEDERICH SIERP.
PAUL BRINKHAUS.